(12) United States Patent
Revelis et al.

(10) Patent No.: US 6,718,836 B2
(45) Date of Patent: Apr. 13, 2004

(54) TWIST TO RELEASE HAND-OPERATED BRAKE ACTUATOR

(75) Inventors: Peter Revelis, Ontario (CA); Michael Sykes, Ontario (CA)

(73) Assignee: Ventra Group Inc., Bradford (CA)

( * ) Notice: Subject to any disclaimer, the term of this patent is extended or adjusted under 35 U.S.C. 154(b) by 0 days.

(21) Appl. No.: 10/153,860

(22) Filed: May 24, 2002

(65) Prior Publication Data

US 2003/0000780 A1 Jan. 2, 2003

Related U.S. Application Data

(60) Provisional application No. 60/292,925, filed on May 24, 2001.

(51) Int. Cl.[7] .............................................. F16H 55/17
(52) U.S. Cl. ........................................ 74/89.23; 74/459
(58) Field of Search ................................ 74/89.23, 530, 74/535, 536, 459

(56) References Cited

U.S. PATENT DOCUMENTS

| | | |
|---|---|---|
| 1,033,145 A | 7/1912 | Azbill |
| 1,631,066 A | 5/1927 | Saget |
| 2,248,364 A | 7/1941 | Leach ........................ 74/89.23 |
| 5,676,023 A | 10/1997 | Masuda et al. |
| 5,913,941 A * | 6/1999 | Erikson et al. ................ 94/459 |

* cited by examiner

Primary Examiner—Matthew C. Graham
(74) Attorney, Agent, or Firm—Pillsbury Winthrop LLP

(57) ABSTRACT

The present application relates to brake actuators, and more particularly to a brake actuator of the hand-operated type in which a hand grip is rotated to release a pawl for enabling brake releasing movement of a brake lever.

18 Claims, 4 Drawing Sheets

← HAND GRIP END

PAWL END →

TWIST TO RELEASE HAND-OPERATED BRAKE ACTUATOR

The present application claims priority to U.S. Provisional Application Serial No. 60/292,925, filed May 24, 2001, the entirety of which is hereby incorporated into the present application by reference.

FIELD OF THE INVENTION

The present invention relates to brake actuators, and more particularly to a brake actuator of the hand-operated type in which a hand grip is rotated to release a pawl for enabling brake releasing movement of a brake lever.

BACKGROUND OF THE INVENTION

A parking brake actuating assembly is typically installed in a passenger compartment of a motor vehicle adjacent the driver's seat. The motor vehicle has a brake system that is actuated to prevent vehicle wheel rotation and hence rolling movement of the vehicle by applying tension to a vehicle brake cable that connects to the brake system.

The typical parking brake actuating assembly comprises a stationary sector having a plurality of teeth. A brake lever is mounted for pivotal movement relative to the sector and is adapted to be operatively connected to the vehicle brake cable. The brake lever is pivotable in a brake applying direction to apply tension to the vehicle brake cable and in a brake releasing direction opposite the brake applying direction to release tension on the brake cable and release the vehicle brakes. A pawl is normally mounted to the brake lever for movement between engaged and disengaged positions relative to the sector teeth. When the pawl is in the engaged position and the brake lever is in the braking position, the pawl engages the teeth to prevent the brake lever from pivoting in the brake releasing direction. When pawl is in the disengaged position, the pawl disengages from the teeth to allow the brake lever to pivot from the braking position thereof towards and into the released position thereof. An elongated release member is mounted to the brake lever for longitudinal movement relative to the brake lever between normal and depressed positions. An activation button, which protrudes out of an outer end of the brake lever, is connected to an outer end of the release member. An inner end of the release member is connected to the pawl such that when the release member is moved into the depressed position, the pawl is forced into the disengaged position.

In this type of brake actuator assembly, the tension created in the brake cable system when the lever is in the brake applied position tends to force the pawl into a binding engagement with the sector teeth. To move the lever to its brake released position, the user must first lift the brake lever in the brake applying direction to remove the cable tension load from the pawl and then depresses the activation button to disengage the pawl. This is because the button is typically depressed with the user's thumb, which typically does not have enough strength to overcome the binding engagement between the pawl and the sector. Additionally, to move the lever further in the brake applying direction prior to depressing the button, the user must apply more force to the lever than was originally used to apply the brake. This can be a problem, for example, where a strong person applies the brake and then later a weaker person attempts to release the brake. It would be desirable to provide a system whereby the use of this push-button and the additional step of lifting the lever prior to releasing the brakes are eliminated.

U.S. Pat. No. 2,248,364 discloses a twist release type hand brake actuator that eliminates the use of a push button. In the '364 patent, the user rotates a hand grip on the end of the lever to disengage the pawl from the sector with which it is engaged. The hand grip has a cam structure mounted internally thereof that engages a pin. This pin is fixed on a rod that is connected to a plate that has a lug thereon. Rotation of the hand grip cams the cam structure against the pin so that the pin is forced outwardly with respect to the lever to pull the rod, which in turn pulls the plate. The plate has a lug thereon the engages the pawl to pivot it out of engagement with the sector. A spring is connected between the pawl and the plate. When the pawl is disengaged by the lug, the spring functions to bias the rod and plate back to their normal positions whereat the lug will disengage from the pawl; and upon disengagement of the lug from the pawl, the spring functions to pivot the pawl into engagement with the sector.

The construction disclosed in the '364 patent has certain shortcomings. For example, the cam and pin mechanism that translates rotation of the hand grip into movement of the rod is mounted internally to the hand grip. This is undesirable because it increases the complexity of the grip itself, which must include suitable internal components for providing the translating action. Further, the plate and spring arrangement used to disengage and bias the pawl are relative complex and difficult to assemble, which leads to increased part and manufacturing complexity and cost.

SUMMARY OF THE INVENTION

One aspect of the invention provides with an improved location for its translation mechanism for translating rotational movement of the hand grip to substantially linear movement of a link for releasing the pawl. The actuator comprises a mounting bracket constructed to mount the brake actuator in a passenger compartment of the motor vehicle; a sector provided on the mounting bracket and having a plurality of teeth; and a brake lever mounted for movement relative to the mounting bracket and the sector. The brake lever includes a linkage connector constructed to be connected to the brake actuating linkage. The brake lever is movable in a brake applying direction to actuate the brake actuating linkage and in a brake releasing direction opposite the brake applying direction to release the brake actuating linkage. A pawl is mounted to the brake lever for movement between engaged and disengaged positions relative to the teeth of the sector. The pawl engages the teeth of the sector to prevent the brake lever from pivoting in the brake releasing direction when in the engaged position, and in the disengaged position is disengaged from the teeth to allow the brake lever to pivot in the brake releasing direction.

A pawl release system comprises a rotatable hand grip rotatably mounted on a free end of the lever and an elongated link extending inwardly along the lever. The link may be comprised by one or more components, but may be a singular rod. The link is connected to the pawl and movable in a shifting manner such that movement of the link in a pawl releasing direction moves the pawl from the engaged position thereof to the disengaged position thereof, thus enabling the brake lever to be moved in the brake releasing direction thereof. The link may be curved or comprised of components joined at an angle, and the shifting movement is any type of movement, such as a linear movement, that effects movement of the pawl. A translation mechanism is mounted on the lever proximally of the hand grip and couples the hand grip to the link such that rotation of the hand grip is translated to affect movement of the link in the pawl releasing direction to move the pawl from the engaged position thereof to the disengaged position thereof. At least one spring is constructed to bias the pawl release system to normally maintain the pawl in the pawl engaged position thereof. The spring may bias the pawl directly, or may bias it indirectly via the link and/or the hand grip.

On advantage of having the translation mechanism mounted on the lever inward of the hand grip, as opposed to inside the hand grip, is that the hand grip can be made smaller, saving valuable space in the passenger compartment.

Another aspect of the invention provides an improved arrangement for providing a hand-operated brake actuator for actuating a brake actuating linkage connected to a brake system of a motor vehicle. The actuator comprises a mounting bracket constructed to mount the brake actuator in a passenger compartment of the motor vehicle; a sector provided on the mounting bracket and having a plurality of teeth; and a brake lever mounted for movement relative to the mounting bracket and the sector. The brake lever includes a linkage connector constructed to be connected to the brake actuating linkage. The brake lever is movable in a brake applying direction to actuate the brake actuating linkage and in a brake releasing direction opposite the brake applying direction. A pawl is mounted to the brake lever for movement between engaged and disengaged positions relative to the teeth of the sector. The pawl engages the teeth of the sector to prevent the brake lever from pivoting in the brake releasing direction when in the engaged position; and in the disengaged position is disengaged from the teeth to allow the brake lever to pivot in the brake releasing direction.

A pawl release system comprises a rotatable hand grip rotatably mounted on a free end of the lever. A rigid rod extends inwardly along the lever. The rod may be curved, straight, or may be constituted by smaller rods or other substantially rigid members coupled together. The rod is connected to the pawl and movable in a substantially linear manner such that movement of the rod inwardly relative to the lever in a pawl releasing direction moves the pawl from the engaged position thereof to the disengaged position thereof, thus enabling the brake lever to be moved in the brake releasing direction thereof. A translation mechanism is mounted proximally of the hand grip and couples the hand grip to the rod such that rotation of the hand grip is translated to affect inward movement of the rod in the pawl releasing direction to move the pawl from the engaged position thereof to the disengaged position thereof. The system also includes a pair of spring seats. One of the spring seats is a fixed spring seat, which may be provided by the lever, by one of the other components of the pawl release system, or by any other suitable structure. The other spring seat is provided on the rod. At least one spring is constructed to bias the pawl release system to normally maintain the pawl in the pawl engaged position thereof. The at least one spring includes a rod biasing spring positioned between the spring seats so as to bias the rod in a pawl engaging direction opposite the pawl releasing direction.

Other objects, features, and advantages of the present invention will become apparent from the following detailed description, the accompanying drawings, and the appended claims.

DETAILED DESCRIPTION OF THE ILLUSTRATED EMBODIMENT(S)

Figure 1A:
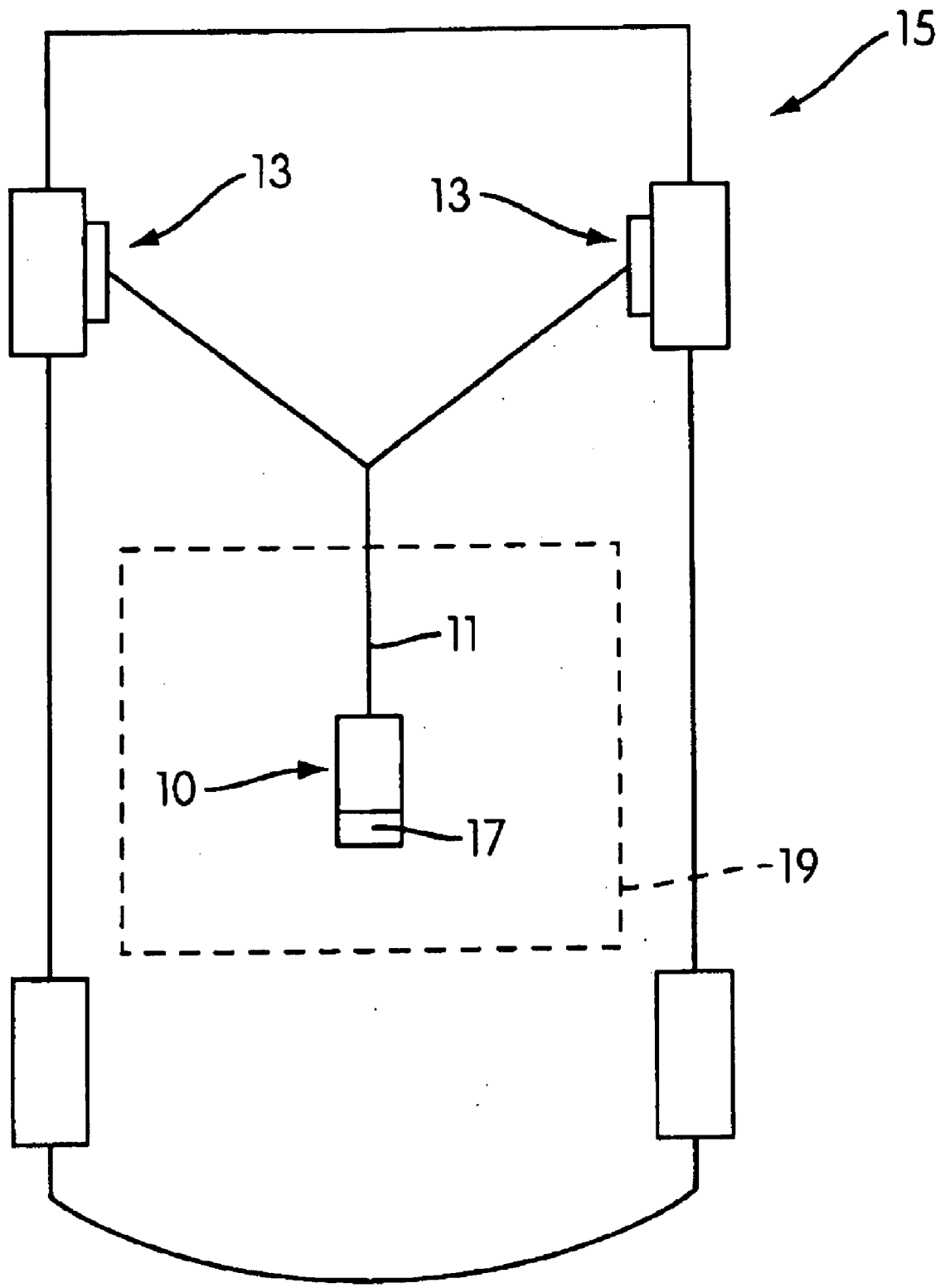
FIG. 1A is a schematic view of a motor vehicle illustrating the brake system and brake actuator thereof.
Figure 1B:
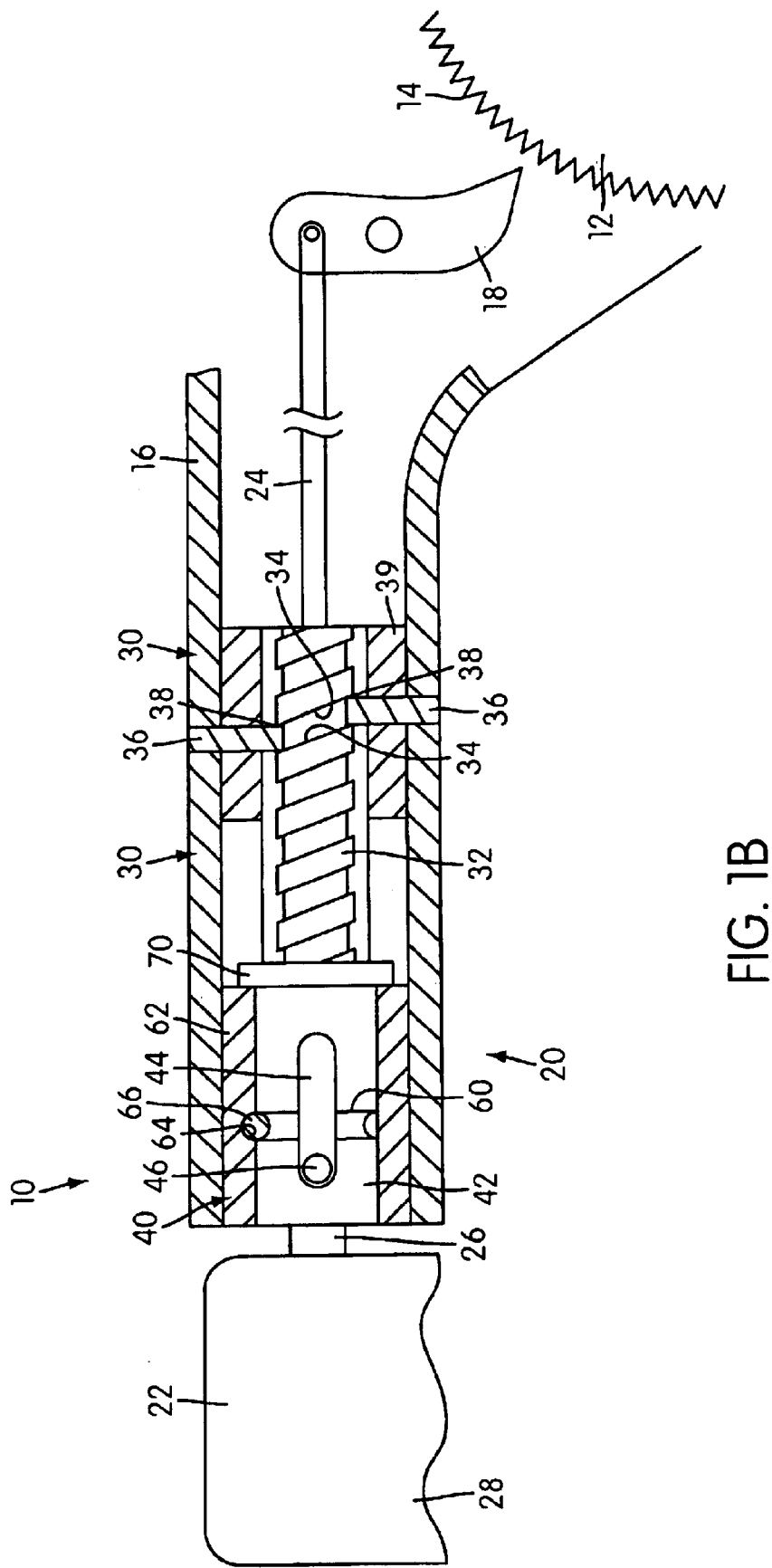
FIG. 1B is a partial cross-sectional view showing a brake actuator constructed in accordance with the principles of the present invention.
Figure 2:
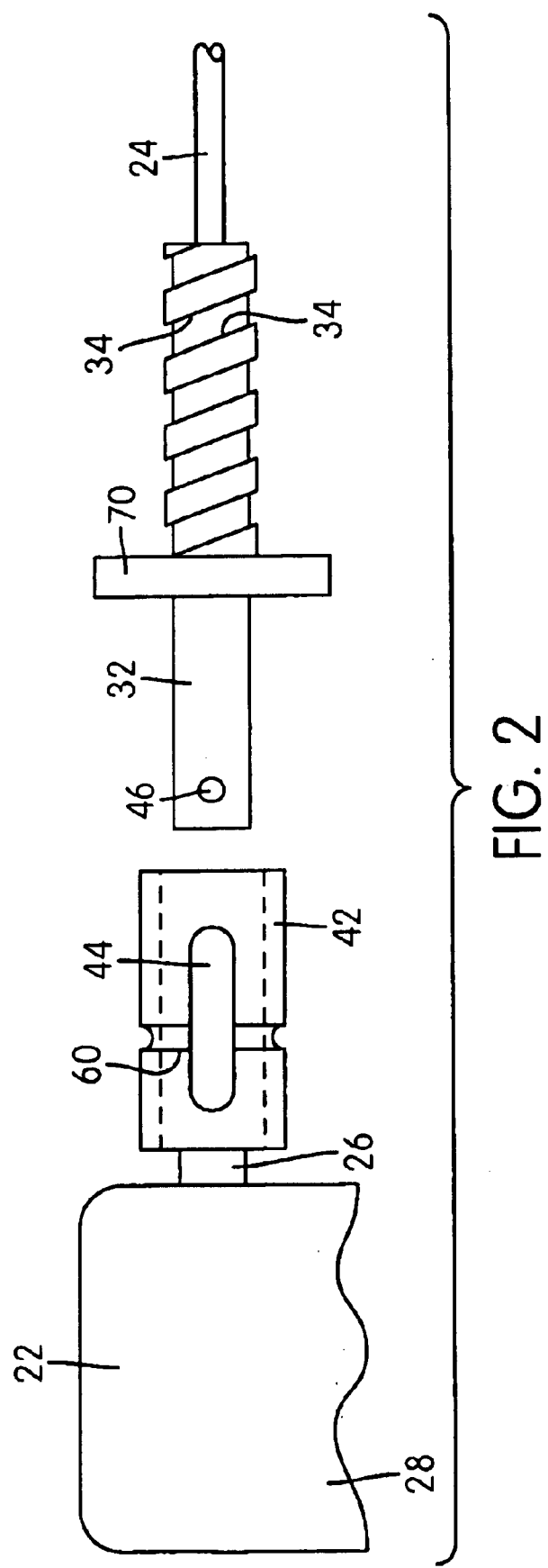
FIG. 2 is a profile view showing components of the brake actuator of FIG. 1B.
Figure 3:
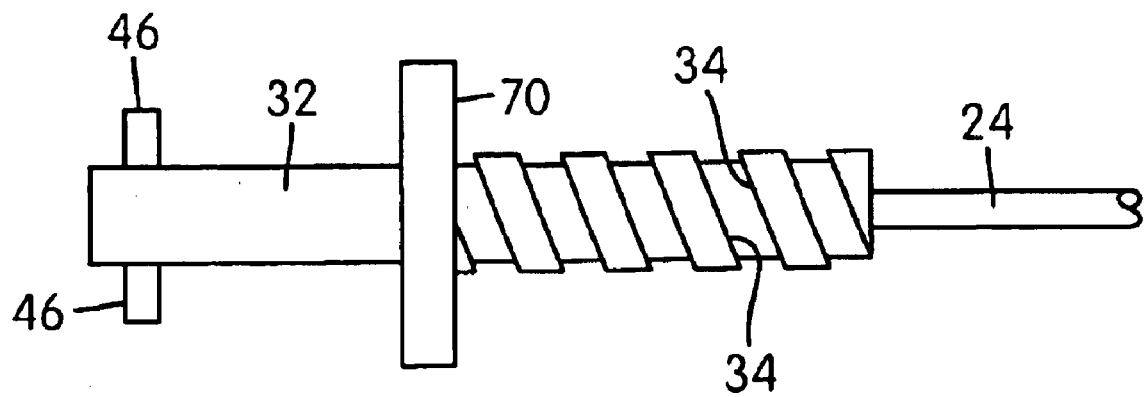
FIG. 3 is a top plan view showing a piston used in the brake actuator of FIG. 1B.

FIGS. 1A–3 illustrate a hand-operated brake actuator, generally indicated at 10, for actuating a brake actuating linkage 11 connected to a brake system 13 of a motor vehicle 15. The brake actuating linkage 11 will typically be a brake cable, but may have any construction or configuration. As the present invention is primarily concerned with the componentry related to releasing the pawl the maintains the brake actuator in a brake applied position, the FIGS. show only the components for releasing the pawl and the remainder of the brake actuator 10 is not illustrated. However, reference may be made to U.S. Pat. Nos. 6,286,389, 6,282,980, and 6,237,731 for examples of brake actuators with which the present invention may be used. These patents are incorporated into the present application by reference in their entirety. Of course, the present invention may be applied to any type of hand-operated brake actuator, and need not be limited to the construction disclosed herein or the constructions disclosed in these incorporated patents.

The actuator 10 comprises a mounting bracket 17 constructed to mount the brake actuator 10 in a passenger compartment 19 of the motor vehicle 15. A stationary sector 12 is provided on the mounting bracket 17 and has a plurality of teeth 14. The sector 12 may be formed integrally on the bracket 17, or formed as a separate component and mounted thereto. A brake lever 16 is mounted for movement relative to the mounting bracket 17 and the sector 12. The brake lever 16 includes a linkage connector (not shown) constructed to be connected to the brake actuating linkage 11. In a construction designed for actuating a brake cable connected to the vehicle braking system, the linkage connector would typically be provided by a slot (not shown) on a take-up reel (not shown) pivoted by the lever 16 and upon which the cable is wound during brake application. This slot receives a head provided on the end of the cable. Reference may be made to any one of the above-incorporated patents for further details in this regard. However, any suitable arrangement for directly or indirectly connecting a brake actuating linkage 11 to the lever 16 may be used. As can be appreciated, the term brake lever is being used herein to encompass not only the part that the user grabs and pivots, but also the components associated therewith that travel to actuate the brake linkage.

The brake lever 16 is movable in a brake applying direction to actuate the brake actuating linkage and in a brake releasing direction opposite the brake applying direction. In the illustrated embodiment, the lever 16 is pivoted on the mounting bracket. A pawl 18 is pivotally mounted to the brake lever 16 at a point spaced from the lever's pivot. The pawl 18 moves between engaged and disengaged positions relative to the teeth 14 of the sector 12. In its engaged position, the pawl 18 engages the teeth 14 of the sector to prevent the brake lever 16 from pivoting in the brake releasing direction; and in its disengaged position, the pawl 18 is disengaged from the teeth 14 to allow the brake lever 16 to pivot in the brake releasing direction. During movement of the brake lever 16 in the brake applying direction, the pawl 18 will ratchet over the teeth 14 in a conventional manner against the biasing of a spring, which will be discussed hereinbelow.

A pawl release system, generally indicated at 20, is provided to enable the vehicle user to move the pawl 18 from its engaged position engaged with the sector teeth 14 to its disengaged position out of engagement with the sector teeth 14, thus enabling the lever 16 to be moved in a brake releasing direction from a brake applied position to a fully released position. The system 20 comprises a rotatable hand grip 22 rotatably mounted on a free end of the lever 16 and a link 24 extending inwardly along the lever 16. The hand grip 16 includes a central metal base 26 and a molded plastic grip portion 28 surrounding the base 26 to provide a contoured grasping surface for the user. The link 16 is connected to the pawl 18 and movable in a shifting manner, which is substantially linear along the axis of the rod 24 in the illustrated embodiment. This enables movement of the link 24 in a pawl releasing direction to move the pawl 18 from the engaged position thereof to the disengaged position thereof, thus enabling the brake lever 16 to be moved in the brake releasing direction thereof from a brake applied position. In the illustrated embodiment, the link 24 is a rigid rod, preferably made of metal that moves inwardly relative to the lever 16 in the pawl releasing direction thereof. However, in alternative constructions, the link 24 may have other configurations. For example, the actuator 10 may be constructed to replace the rod with a bare flexible cable or a Bowden wire assembly, or the rod may be constituted by interconnected smaller rods or mechanical links coupled together.

The pawl release mechanism 20 further comprises a translation mechanism, generally indicated at 30, mounted inwardly of the hand grip 22. The mechanism 30 couples the hand grip 22 to the link 24 such that rotation of the hand grip 22 is translated to affect movement of the link 24 in the pawl releasing direction to move the pawl 18 from the engaged position thereof to the disengaged position thereof. In the illustrated embodiment, the translation mechanism 30 includes a first cam structure in the form of a piston 32 with a threaded exterior surface providing a cam surface 34 thereon. The translation mechanism also includes a second cam structure in the form of a pair of lugs 36 each with a cam surface 38 thereon. The piston 32 constituting the first cam structure is movable with the rod 24 and the cam surfaces 34, 38 are engaged with one another such that rotation of the hand grip 22 creates a camming action between the cam surfaces 34, 38 to push the rod 24 in the pawl releasing direction (which is to the right in the Figures). Also as illustrated, the translation mechanism 30 also comprises a sleeve 39 encircling the piston 32 and the lugs 36 are provided by pins extending radially inwardly from the sleeve 39. In place of the lugs 66, an internally thread sleeve may be used to cooperate with the threads providing cam surface 34 on the piston 38, or sleeve 39 itself may be so internally threaded.

In the illustrated embodiment, the piston 32 is fixedly connected to the rod 24 and is also connected to the hand grip 22 for rotation therewith by an axial lost motion connection, generally indicated at 40. The lost motion connection 40 is provided by a slotted structure 42 extending inwardly from the hand grip 22 and providing a pair of slots 44 extending axially with respect to the rotational axis of the hand grip 22. A pair of pins 46 are fixed on the piston 32 and extend into the slots 44. The slots 44 engage the pins 46 to rotate the piston 32 while allowing the pins 46 to ride axially therein for permitting axial movement of the piston 32. The pins 46 may be provided by a single shaft penetrating a portion of the piston 32 so as to extend from opposing sides thereof, or may be provided by two separate pins attached on opposite sides of the piston 32. In the illustrated embodiment, the slotted structure 42 is a tubular member affixed to the hand grip 22, but any suitable construction may be used.

The slotted structure 42 has an annular groove 60 around the periphery thereof. A grip bearing sleeve 62 is inserted in the free end of the lever 16 and may optionally be fixed by welding. The grip bearing sleeve 62 has a pair of openings (not shown) formed therethrough and communicated by a groove 64. The hand grip 22 is mounted by inserting the slotted structure 44 into the grip bearing sleeve 62 with the groove 60 aligned with groove 64. A clevis pin 66, or some other structure, is inserted through the openings so that it is received in the grooves 60, 64 as shown to lock the slotted structure 42 in place, and hence axially lock the hand grip 22 to the lever 16. Because the pin 66 is received in the groove 60, the slotted structure 42 can still be rotated to allow rotation of the hand grip 22. The pin 66 may also be inserted through openings in the lever 16 to axially fix the slotted structure 42, and thus the grip 22, on the lever 16.

Figure 4:
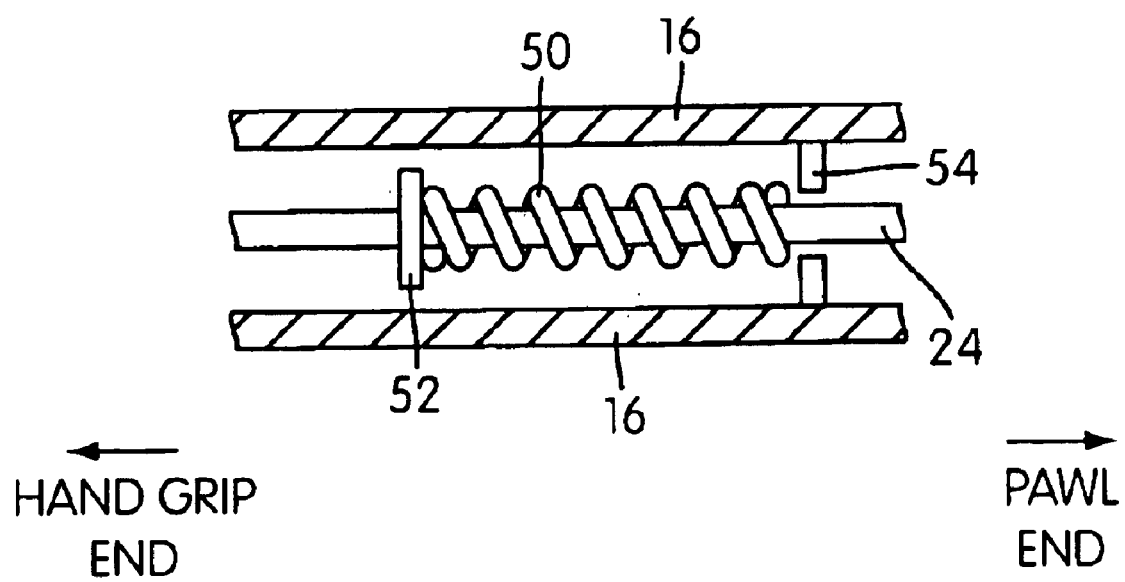
FIG. 4 is a partial cross-sectional view showing a portion of the brake actuator of FIG. 1B between the pawl and the translation mechanism.

The pawl release mechanism 20 includes at least one spring constructed to bias the pawl release system to normally maintain the pawl in the pawl engaged position thereof. One or more springs may be used to bias the pawl directly, or to bias it indirectly via the rod and/or the hand grip. In the illustrated embodiment, a single coil spring 50. As shown in FIG. 4, the rod 24 has a spring seat 52 thereon and the lever 16 provides a spring seat 54 thereon. The spring 50 includes is positioned in compression between the spring seats 52, 54 so as to bias the rod 24 in the pawl engaging direction opposite the pawl releasing direction. The spring 50 encircles the rod 24 for compactness. Alternatively, the spring seat 54 could be provided by any suitable surface in the system, such as the inner end of the sleeve 39.

An optional blocking member 70 is provided on the piston 32. The blocking member 70 engages the inner end of the grip bearing sleeve 62 when the piston 32 is in a position corresponding to the pawl engaged position. The blocking member 70 prevents the piston 32 from moving further outwardly, which in turn prevents the rod 24 from loading further pressure on the pawl 18. Also, the presence of the blocking member 70 configures the actuator 10 so that the hand grip 22 can only be rotated in one direction to release the pawl 18. In the illustrated embodiment, the orientation of the cam surface 34 is such that rotation of the hand grip 22 in a counterclockwise direction (as viewed looking directly at the free end of the hand grip 22) moves the piston 32 and rod 24 in the pawl releasing direction. The spring 50 will bias the rod 24 back in the pawl engaging direction, which in turn causes the hand grip 22 to rotate back in the clockwise direction to its normal, unactivated position via the camming action provided by the cam surfaces 34, 38. This arrangement is suited particularly for vehicles wherein the driver is seated on the left hand side of the vehicle, as the user's right hand is used in a better leveraged and more natural motion to rotate the hand grip 22. Of course, the orientation of the cam surface 34 may be reversed for vehicles wherein the driver is seated on the right side of the vehicle, as is the case in England. These particular orientations are not intended to be limiting and instead are provided to note features of the particular embodiment illustrated.

Likewise, the translation mechanism 30 may be configured such that rotation of the hand grip 22 in either direction moves the rod 24 in the pawl releasing direction.

The pitch of the cam surface 34 may also be varied to achieve different levels of mechanical advantage. Also, the diameter of the hand grip 22 may likewise be varied to achieve different levels of mechanical advantage. The total amount of mechanical advantage provided should be enough to overcome the binding engagement of the pawl 18 with the sector teeth 14 without having to lift the lever 16.

The foregoing illustrated embodiment has been provided solely to illustrate the structural and functional principles of the present invention and is not intended to be limiting. To the contrary, the present invention is intended to encompass all changes, modifications, substitutions, and alterations encompassed within the spirit and scope of the appended claims.

What is claimed:

1. A hand-operated brake actuator for actuating a brake actuating linkage connected to a brake system of a motor vehicle, the actuator comprising:
   a mounting bracket constructed to mount the brake actuator in a passenger compartment of the motor vehicle;
   a sector provided on the mounting bracket and having a plurality of teeth;
   a brake lever assembly including a brake lever having a distal end portion and a proximal end portion, the brake lever being mounted at its proximal end portion for movement relative to the mounting bracket and the sector, the brake lever assembly including a linkage connector constructed to be connected to the brake actuating linkage, the brake lever being movable in a brake applying direction to move the linkage connecter to actuate the brake actuating linkage and in a brake releasing direction opposite the brake applying direction;
   a pawl mounted to the brake lever in spaced relation from the distal end portion towards the proximal end portion for movement between engaged and disengaged positions relative to the teeth of the sector, the pawl engaging the teeth of the sector to prevent the brake lever from pivoting in the brake releasing direction when in the engaged position, the pawl in the disengaged position being disengaged from the teeth to allow the brake lever to pivot in the brake releasing direction; and
   a pawl release system comprising:
      a rotatable hand grip rotatably mounted on the distal end portion of the lever;
      a link extending proximally along the lever toward the proximal end portion, the link being connected to the pawl and movable in a shifting manner such that movement of the link in a pawl releasing direction moves the pawl from the engaged position thereof to the disengaged position thereof, thus enabling the brake lever to be moved in the brake releasing direction thereof;
      a translation mechanism mounted to the lever proximally of the hand grip and coupling the hand grip to the link such that rotation of the hand grip is translated to affect movement of the link in the pawl releasing direction to move the pawl from the engaged position thereof to the disengaged position thereof; and
      at least one spring constructed to bias the pawl release system to normally maintain the pawl in the pawl engaged position thereof.

2. An actuator according to claim 1, wherein the link is a rigid rod and wherein the rod moves inwardly relative to the lever in the pawl releasing direction thereof.

3. An actuator according to claim 2, wherein the rod has a spring seat thereon and wherein the lever provides a spring seat thereon, the at least one spring including a rod biasing spring positioned between the spring seats so as to bias the rod in a pawl engaging direction opposite the pawl releasing direction.

4. An actuator according to claim 3, wherein the rod biasing spring encircles the rod.

5. An actuator according to claim 4, wherein the translation mechanism includes a first cam structure with a cam surface thereon and a second cam structure with a cam surface thereon; the first cam structure being movable with the rod and the cam surfaces being engaged with one another such that rotation of the hand grip creates a camming action between the cam surfaces to move the rod in the pawl releasing direction.

6. An actuator according to claim 5, wherein the first cam structure is a piston fixedly connected to the rod and connected to the hand grip for rotation therewith by an axial lost motion connection, and wherein the second cam structure is a lug fixed with respect to the brake lever, the cam surface of the lug being engaged with the cam surface of the piston such that rotation of the hand grip creates the camming action between the cam surfaces of the lug and piston to move the piston and rod in the pawl releasing direction with the axial lost motion connection enabling the piston to move in the pawl releasing direction without axial movement of the hand grip.

7. An actuator according to claim 6, wherein the translation mechanism comprises a sleeve encircling the piston and wherein the lug is provided by one or more pins extending radially inwardly from the sleeve.

8. An actuator according to claim 6, wherein the lost motion connection is provided by a slotted structure proximally of the hand grip and providing a pair of slots extending axially with respect to the rotational axis of the hand grip, and a pair of pins fixed on the piston and extending into the slots, the slots engaging the pins to rotate the piston while allowing the pins to ride axially therein for permitting axial movement of the piston.

9. An actuator according to claim 8, wherein the pins are provided by a single shaft penetrating a portion of the piston so as to extend from opposing sides thereof.

10. An actuator according to claim 9, wherein the slotted structure is a tubular member affixed to the hand grip.

11. A hand-operated brake actuator for actuating a brake actuating linkage connected to a brake system of a motor vehicle, the actuator comprising:
   a mounting bracket constructed to mount the brake actuator in a passenger compartment of the motor vehicle;
   a sector provided on the mounting bracket and having a plurality of teeth;
   a brake lever assembly including a brake lever having a distal end portion and a proximal end portion, the brake lever being mounted at its proximal end portion for movement relative to the mounting bracket and the sector, the brake lever assembly including a linkage connector constructed to be connected to the brake actuating linkage, the brake lever being movable in a brake applying direction to move the linkage connector to actuate the brake actuating linkage and in a brake releasing direction opposite the brake applying direction;
   a pawl mounted to the brake lever in a spaced relation from the distal end portion towards the proximal end portion for movement between engaged and disengaged positions relative to the teeth of the sector, the pawl engaging the teeth of the sector to prevent the brake lever from pivoting in the brake releasing direction when in the engaged position, the pawl in the disengaged position being disengaged from the teeth to allow the brake lever to pivot in the brake releasing direction; and a pawl release system comprising:
- a rotatable hand grip rotatably mounted on the distal end portion of the lever;
- a rigid rod extending proximally along the lever toward the proximal end portion, the rod being connected to the pawl and movable in a shifting manner such that movement of the rod inwardly relative to the lever in a pawl releasing direction moves the pawl from the engaged position thereof to the disengaged position thereof, thus enabling the brake lever to be moved in the brake releasing direction thereof;
- a translation mechanism mounted proximally of the hand grip and coupling the hand grip to the rod such that rotation of the hand grip is translated to affect inward movement of the rod in the pawl releasing direction to move the pawl from the engaged position thereof to the disengaged position thereof;
- a pair of spring seats, one of the spring seats being a fixed spring seat and the other spring seat being provided on the rod; and
- at least one spring constructed to bias the pawl release system to normally maintain the pawl in the pawl engaged position thereof, the at least one spring including a rod biasing spring positioned between the spring seats so as to bias the rod in a pawl engaging direction opposite the pawl releasing direction.

12. An actuator according to claim 11, wherein the rod biasing spring encircles the rod.

13. An actuator according to claim 12, wherein the translation mechanism includes a first cam structure with a cam surface thereon and a second cam structure with a cam surface thereon; the first cam structure being movable with the rod and the cam surfaces being engaged with one another such that rotation of the hand grip creates a camming action between the cam surfaces to move the rod in the pawl releasing direction.

14. An actuator according to claim 13, wherein the first cam structure is a piston fixedly connected to the rod and connected to the hand grip for rotation therewith by an axial lost motion connection, and wherein the second cam structure is a lug fixed with respect to the brake lever, the cam surface of the lug being engaged with the cam surface of the piston such that rotation of the hand grip creates the camming action between the cam surfaces of the lug and piston to move the piston and rod in the pawl releasing direction with the axial lost motion connection enabling the piston to move in the pawl releasing direction without axial movement of the hand grip.

15. An actuator according to claim 14, wherein the translation mechanism comprises a sleeve encircling the piston and wherein the lug is provided by one or more pins extending radially inwardly from the sleeve.

16. An actuator according to claim 14, wherein the lost motion connection is provided by a slotted structure proximally of the hand grip and providing a pair of slots extending axially with respect to the rotational axis of the hand grip, and a pair of pins fixed on the piston and extending into the slots, the slots engaging the pins to rotate the piston while allowing the pins to ride axially therein for permitting axial movement of the piston.

17. An actuator according to claim 16, wherein the pins are provided by a single shaft penetrating a portion of the piston so as to extend from opposing sides thereof.

18. An actuator according to claim 17, wherein the slotted structure is a tubular member affixed to the hand grip.

* * * * *